United States Patent [19]

Frye

[11] 4,395,811

[45] Aug. 2, 1983

[54] HOSE CONNECTORS AND METHODS FOR MAKING AND APPLYING SAME

[76] Inventor: Richard D. Frye, 900 Lime La., Marathon, Fla. 33050

[21] Appl. No.: 310,303

[22] Filed: Oct. 9, 1981

Related U.S. Application Data

[62] Division of Ser. No. 148,581, May 9, 1980, Pat. No. 4,335,753.

[51] Int. Cl.³ .............................................. B21D 53/36
[52] U.S. Cl. ........................................ 29/507; 72/68; 72/105; 72/348
[58] Field of Search .................... 72/67, 68, 105, 106, 72/348, 349; 285/258, 382.4; 29/455 R, 507

[56] References Cited

U.S. PATENT DOCUMENTS

| 532,355 | 1/1895 | Bellinger | 72/349 |
| 1,672,694 | 6/1928 | Shrum | 72/348 |
| 1,915,041 | 6/1933 | Wallace | 29/507 |
| 2,086,488 | 7/1937 | Batie | 72/68 |
| 2,269,313 | 1/1942 | Klocke | 72/349 |
| 2,287,691 | 6/1942 | Marchou | 72/377 |

FOREIGN PATENT DOCUMENTS 11638 of 1899 United Kingdom .................. 72/348

Primary Examiner—Lowell A. Larson
Attorney, Agent, or Firm—Roylance, Abrams, Berdo & Farley

[57] ABSTRACT

Male threaded hose connectors in the form of an integral sheet metal piece, methods for making such connectors, and hose equipped therewith. The male threaded portion of the connector surrounds the hose and includes rolled sheet metal threads embedded in the hose material.

7 Claims, 7 Drawing Figures

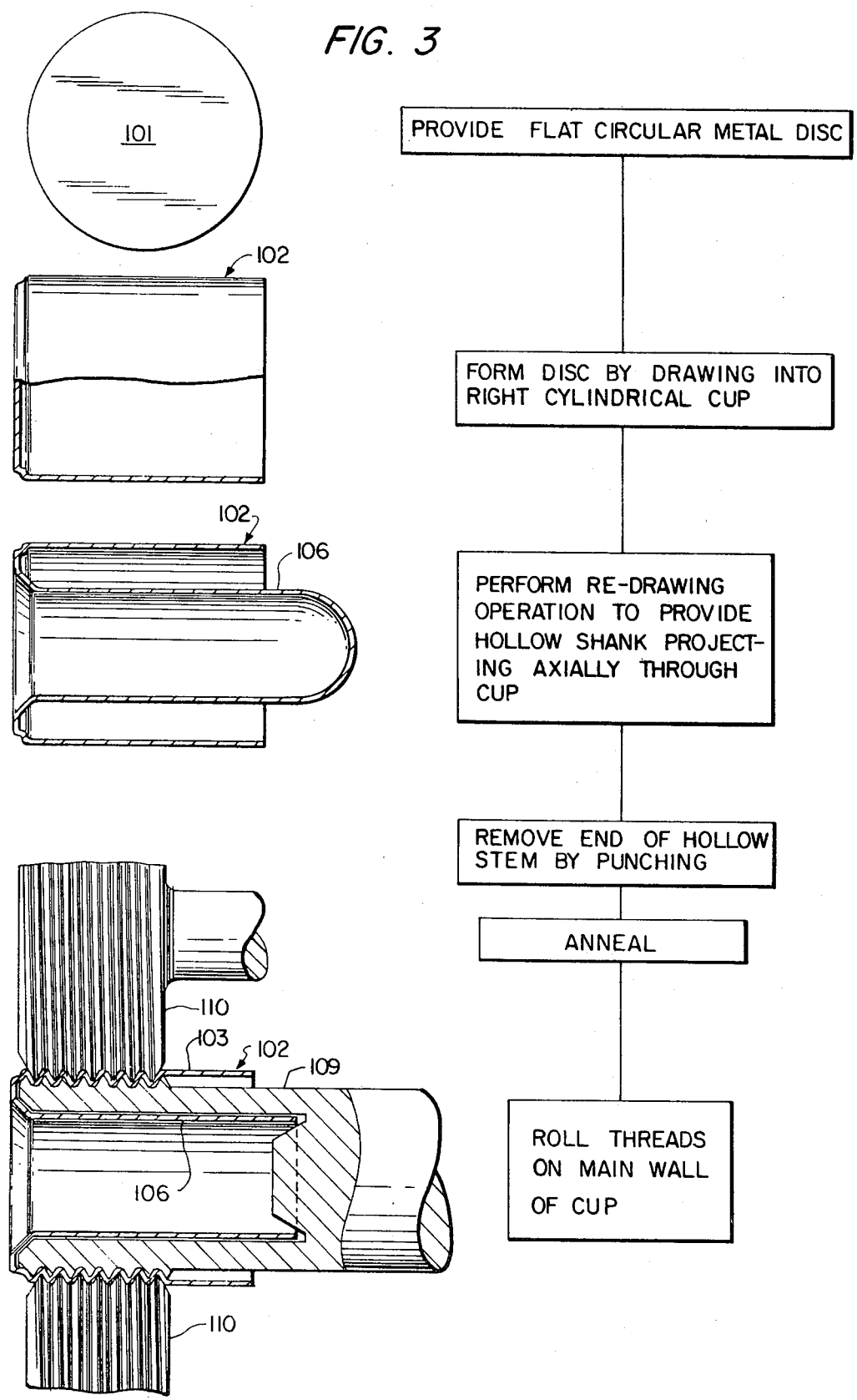

BEND FREE EDGE OF CUP INWARDLY UPON ITSELF

INSERT HOSE AND EXPAND CENTRAL STEM TO COMPRESS HOSE END IN COUPLING MEMBER AS IN FIG. 1A

HOSE CONNECTORS AND METHODS FOR MAKING AND APPLYING SAME

This is a division of application Ser. No. 148,581 filed May 9, 1980 now U.S. Pat. No. 4,335,753 of June 22, 1982.

BACKGROUND OF THE INVENTION

It is very old to equip hoses, typically garden hoses and hoses for household appliances and the like, with threaded connectors. Facing a continuing demand for economy and mass production, the hose connector industry has simplified threaded connectors and adopted advanced metal forming techniques. Thus, it has become common to make threaded hose connectors of thin metal, with the hose end clamped between a hollow inner stem, from which the threaded element projects axially, and a separate outer sleeve, as seen in
U.S. Pat. No. 2,338,666, Nelson
U.S. Pat. No. 2,623,837, Butler
U.S. Pat. No. 3,220,753, Kasidas.

It has also been proposed, in heavier connectors, to make the outer sleeve integral with the threaded element, as seen in
U.S. Pat. No. 2,147,355, Scholtes
U.S. Pat. No. 2,268,088, Scholtes Despite much success in the trade, there has been a continuing demand for simplification, functional improvement, and lower cost.

OBJECTS OF THE INVENTION

A general object is to provide a male threaded hose connector which is simpler and less costly than those of the prior art.

Another object is to devise an improved method for manufacturing such connectors and applying them to the hose.

A further object is to provide an improved hose-and-hose connector combination.

Yet another object is to devise a male threaded connector formed from sheet metal as an integral piece.

SUMMARY OF THE INVENTION

Hose connectors according to the invention comprise an outer sleeve, a transverse annular end wall extending inwardly from one end of the sleeve, and a tubular stem extending axially from the end wall through the sleeve, the sleeve, end wall and stem being integral, the sleeve being formed throughout a major portion of its length with rolled threads, and the connector being applied to the hose by inserting an end of the hose between the sleeve and stem and expanding the stem to compress and clamp the hose between the stem and sleeve with the material of the hose filling the inner spaces of the roller threads.

Method embodiments of the invention commence by providing a flat circular sheet metal blank, drawing the blank into a cup, performing a second drawing operation on the bottom of the cup to provide a tubular stem, and rolling the threads on the outer wall of the cup, which becomes the sleeve of the connector, the sheet metal of the original blank being sufficiently thin to allow the thin metal wall of the sleeve to follow the configuration of the threads so that the threaded portion presents external male threads and an inner surface in the form of female threads. When the second drawing operation has been done, the closed end of the stem is removed, advantageously by punching. The free end portion of the sleeve is bent back upon itself before or after the threads have been formed. The hose end is inserted between the stem and the threaded sleeve, and the stem then expanded to complete the assembly. When the wall thickness of the hose is inadequate, the end of the hose is turned back upon itself to provide at least a double thickness for insertion into the connector. The second drawing operation can include a first step which forms the hollow stem as an axial projection extending away from the cup, the threads then being rolled, and the drawing operation then being completed by a reverse draw. In other embodiments, the stem is drawn directly into the interior of the cup, and the threads then rolled, using a hollow arbor.

IDENTIFICATION OF THE DRAWINGS

In order that the manner in which the foregoing and other objects are achieved according to the invention can be understood in detail, particularly advantageous embodiments thereof will be described with reference to the accompanying drawings, which form part of the original disclosure of this application, and wherein:

FIGS. 1 and 1A present a flow sheet of one method embodiment and include illustrations of the connector member at various stages of its manufacture and application to the hose;

FIG. 2 is a longitudinal sectional view of the hose-and-hose connector according to FIG. 1 coupled to a double female threaded adaptor;

FIGS. 3 and 3A present a flow sheet illustrating another method embodiment; and

FIGS. 4 and 5 are longitudinal sectional views of hose-and-hose connector combinations according to additional embodiments.

DETAILED DESCRIPTION OF THE INVENTION

Figure 1:
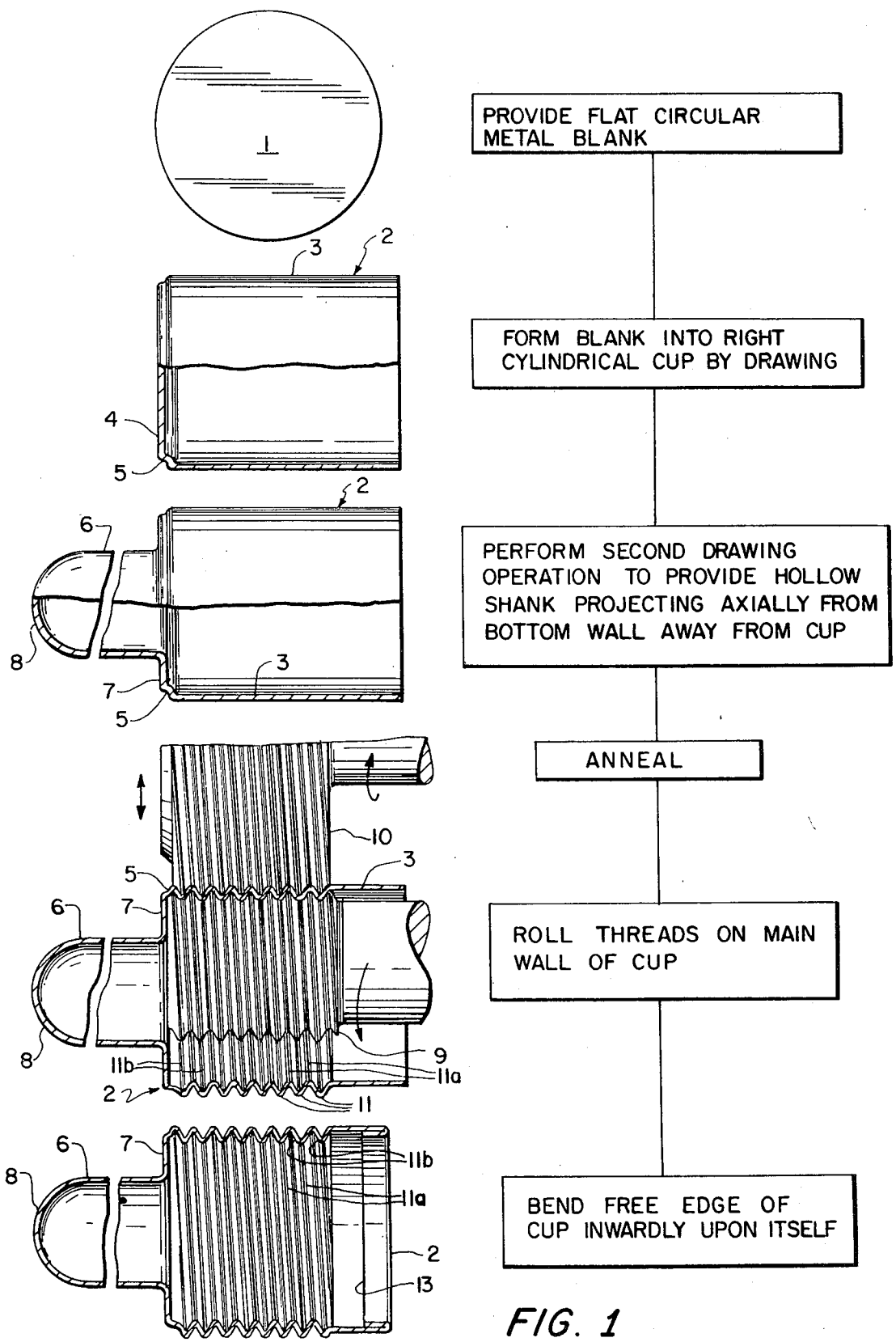
Figure 1A:
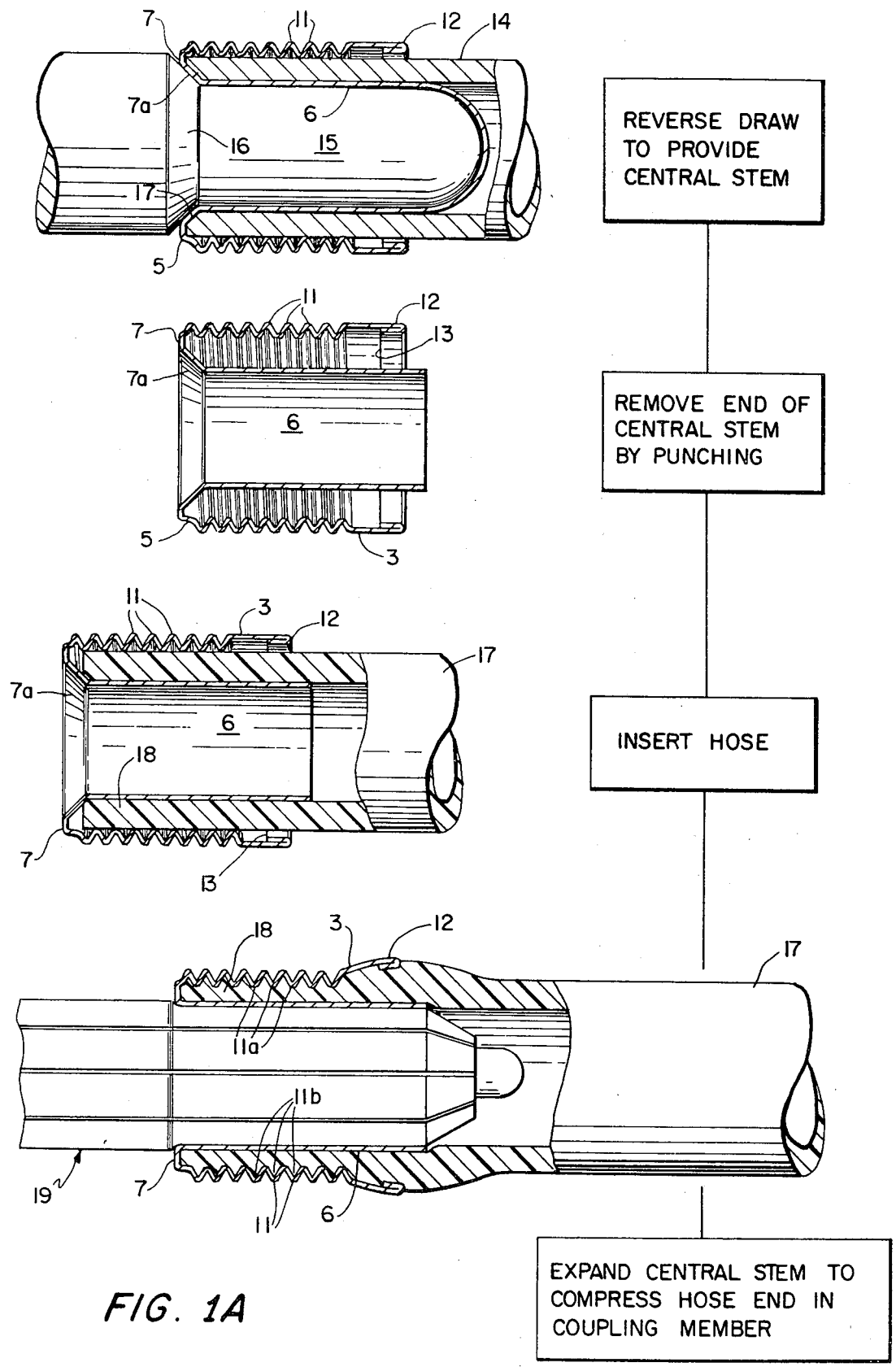

The invention will best be understood if the method embodiments are first described commencing with that of FIGS. 1 and 1A. The method commences with provision of a flat circular blank 1 of sheet metal, typically by stamping the blank from brass sheet 0.015–0.35 in. (0.38–0.89 mm.) thick. Alternatively, blank 1 can be of copper, bronze, aluminum or steel. The blank 1 is first formed by a conventional drawing operation into the shape of a cup 2 having a right cylindrical side wall 3 and a transverse or bottom wall 4, the outer diameter of the side wall being reduced at 5 to a dimension capable of being embraced by the female connector member (not shown) with which the male member being made is to mate. The cup is then subjected to a second drawing operation to form a closed protrusion 6 projecting away from the cup, protrusion 6 being centered on the bottom wall so that a flat annular outer portion 7 of the bottom wall remains. This step is accomplished by conventional sheet metal drawing techniques using, e.g., an annular die and a plunger with a rounded nose, so that the free end of protrusion 6 is closed by rounded end wall 8. The resulting article is then annealed. After annealing, a major portion of the length of side wall 3 is threaded, using a rotating threading mandrel 9 and a cooperating threading roller 10. The resulting rolled threads extend from adjacent annular end wall 7 to a location near but spaced significantly from the free end of wall 3. Formed by conventionally rolling the sheet metal of wall 3, the threads 11 are complete convolutions, so that the outer surface of the threaded portion constitutes male threads while the inner surface has the configuration of a set of female threads and therefore presents inwardly directed crests 11a and inwardly opening spaces 11b between adjacent crests. The unthreaded free end portion of wall 3 is then bent inwardly and back upon itself to provide an annularly reinforced end 12 presenting a shoulder 13 facing toward end wall 7. Using a hollow die 14 and a plunger 15, the position of protrusion 6 is now reversed by reverse drawing, yielding an article in which protrusion 6 projects from end wall 7 completely through the space enclosed by wall 3, portion 6 and wall 3 being concentric and spaced apart. Plunger 15 has a transverse annular shoulder 16, and die 14 has a cooperating annular face 17 so that, as the reverse draw is completed, the inner portion 7a of end wall 7 is deflected into frustoconical form, tapering toward the free end of the plunger. The end of portion 6 is now removed, as by punching, to complete the connector member. In the resulting connector member, wall 3 can be considered as a threaded outer sleeve, and portion 6 as a central stem.

To apply the connector member to the hose 17, an end portion 18 of the hose is inserted into the annular space between stem 6 and outer sleeve 3 until the tip of end portion 8 is adjacent wall 7. An expanding tool 19 is then inserted in collapsed form through stem 6, the tool then expanded to enlarge the diameter of stem 6 and thus compress the end portion 18 of the hose between stem 6 and sleeve 3, and the tool then contracted and withdrawn. Typically, stem 6 is expanded enough to partially or totally eliminate frustoconical wall portion 7a, so the stem then extends with constant diameter from near the end wall 7 to the free end of the stem.

Hose 17 can be of any suitable flexible hose material which is adequately deformably under pressure to allow stem 6 to be expanded radially and to cause the material of the hose wall to firmly engage in the spaces presented by the rolled threads. Hose materials based on truly elastomeric materials, such as the natural and synthetic rubbers, are suitable, as are the so-called thermoplastic elastomers, such as styrene/elastomer block copolymers, including the styrene/butadiene copolymers and styrene/isoprene copolymers, the urethane block copolymers, and the polyolefin blends. Also useful are polymeric hose materials which, though less compressible than elastomeric materials, are characterized by good flexibility and the capability of cold flow.

Expansion of stem 6 applies a strong clamping force on the end portion 18 of the hose and causes the material of the hose wall to enter and at least partially fill the spaces 11b of the rolled threads so that, in effect, the inner crests 11a of the threads become embedded in the hose material, locking the connector against being pulled off the hose. The hose material is also forced outwardly against the unthreaded free end portion of the sleeve, so as to cause the inner portion of reinforcing end 12 to be embedded in the hose material, with shoulder 13 completely or partially engaged in the hose.

Figure 2:
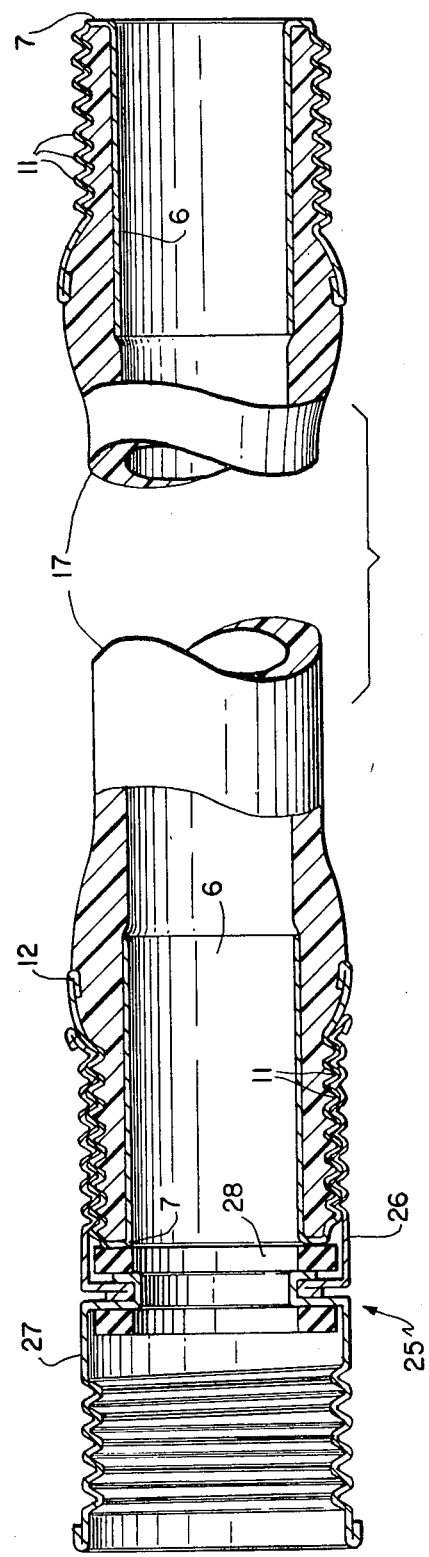

As seen in FIG. 2, the male hose connector produced and applied to the hose in the manner just described can be used in conjunction with an adaptor, such as that indicated generally at 25, the adaptor comprising a threaded female connector member 26, to engage the threads 11 of the male connector, and a second threaded female connector member 27 swivelled to member 26 and capable of being attached to, e.g., a sill cock or to a second male connector (not shown). It will be noted that female connector 26 can be equipped with a sealing washer 28, with end wall 7 of the male connector then engaging the washer. A particularly inexpensive garden hose, for example, can be produced by applying to the remaining end of hose 17 a second male connector made according to FIGS. 1 and 1A, the two male connectors being identical so that adaptor 25 can be applied to either end of the hose.

Figure 3A:
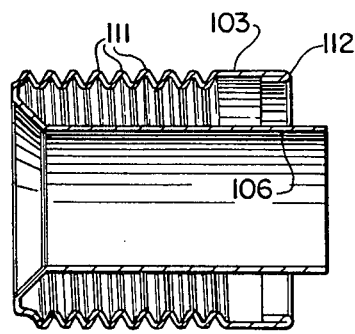

As seen in the flow sheet of FIGS. 3 and 3A, male connector members according to the invention can be made according to a second method embodiment, again commencing with a flat circular sheet metal blank 101 and again drawing that blank into the form of a cup 102. In this embodiment, the axial hollow stem 106 is then formed, by a reverse draw, so that when first formed stem 106 extends axially through the cup 102. The closed end of the stem is then punched out and the article annealed. After annealing, threads are rolled on the side wall 103 of the cup, using a hollow threaded arbor 109 inserted between stem 106 and wall 103, and at least one threading roller 110. When the threads 111 have been rolled, roller or rollers 110 are withdrawn laterally and the threaded article then spun off the arbor by a pair of spinning rollers as disclosed, for example, in U.S. Pat. No. 3,024,677 to George Y. Greiman et al. The free end portion of wall 102 is then bent back upon itself to provide the annularly reinforced end 112, and the connector is then applied to the hose in the same manner described with reference to FIG. 1A. Alternatively, reinforced end 112 can be formed during the drawing process.

Figure 4:
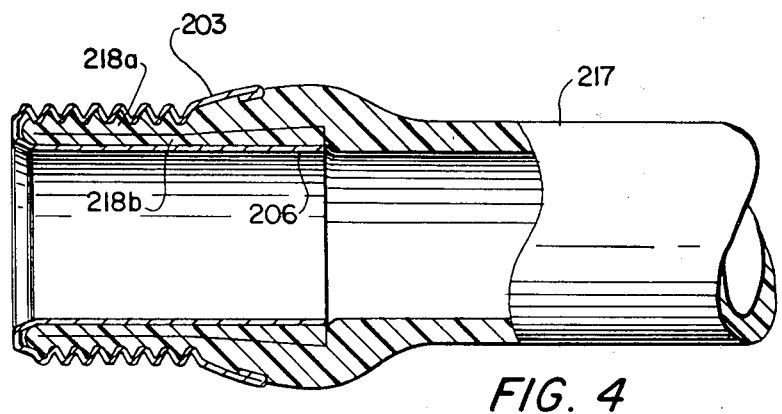
Figure 5:
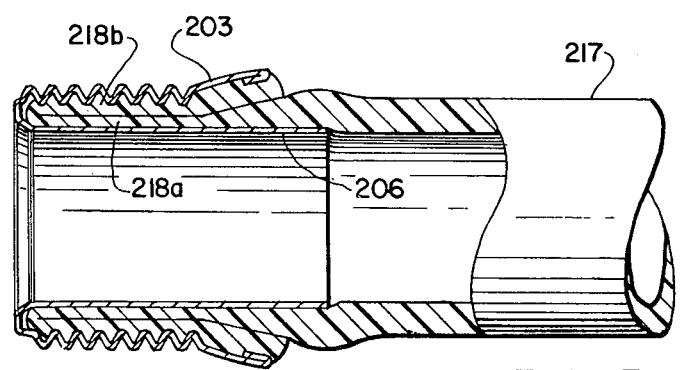

Since application of the connector to the hose requires that the end portion of the hose enclosed by the threaded shell be tightly clamped as a result of the expansion of the central stem, it is advantageous to increase the effective thickness of the end portion of the hose preparatory to attaching the connector. Thus, as seen in FIG. 4, the end portion of hose 217 can be turned inwardly and back upon itself to provide two layers 218a and 218b of the hose material. Alternatively, as seen in FIG. 5, the end portion of the hose can be turned outwardly and back upon itself to provide the two layers 218a and 218b. In both cases, the two layers 218a, 218b are clamped between the stem 206 and threaded wall 203 when the stem is expanded. Provision of the two layers of hose material in the manner illustrated by FIGS. 4 and 5 allows the invention to be applied to hoses of varying wall thickness without requiring that a different size of connector member be made for each hose of different wall thickness.

What is claimed is:

1. The method for making a male threaded hose connector comprising
    forming a flat circular sheet metal blank into a cup;
    drawing the bottom of the cup into a hollow protuberance extending axially within the cup; and
    subjecting the outer wall of the cup to roller threading to form a portion of the outer wall into threads which include outer male crests and inner female crests.

2. The method defined in claim 1, wherein
    said step of forming the blank into a cup is performed by drawing;
    said step of drawing the bottom of the cup into a protuberance is carried out by first drawing the bottom of the cup into a protuberance which projects away from the interior of the cup and then subjecting the protuberance to a reverse drawing operation until the protuberance extends axially within the cup; and said step of subjecting the outer wall of the cup to roller threading is carried out while the protuberance projects away from the interior of the cup.

3. The method defined in claim 1, wherein said step of drawing the bottom of the cup into a protuberance is carried out as a single drawing step; and said step of subjecting the outer wall of the cup to roller threading is carried out after said single drawing step by use of a hollow threading arbor inserted into the annular space between the protuberance and the outer wall.

4. The method defined in claim 1, further comprising bending the free end portion of the outer wall back upon itself to provide an annularly reinforced portion.

5. The method defined in claim 4, wherein the free end portion is bent inwardly and back upon itself; and the terminal edge of the outer wall then constitutes an annular shoulder facing the bottom of the cup.

6. The method for equipping a hose with a male threaded connector, comprising carrying out the method defined in claim 1 to produce the male threaded connector;

inserting an end portion of the hose into the annular space between the protuberance and the outer wall; and expanding the protuberance to compress the end portion of the hose between the protuberance and the outer wall and embed the inner female crests of the threads in the material of the hose wall.

7. The method defined in claim 6, wherein the free end portion of the outer wall is bent inwardly and back upon itself to provide an annularly reinforced portion in which the terminal edge of the outer wall constitutes an inwardly directed shoulder; and the step of expanding the protuberance embeds said shoulder in the material of the hose wall.

* * * * *